United States Patent [19]
Watanabe et al.

[11] Patent Number: 5,408,364
[45] Date of Patent: Apr. 18, 1995

[54] ROTARY HEAD VTR WHICH RECORDS VIDEO AND PCM SIGNALS IN RESPECTIVE AREAS OF A SLANT TRACK AND A SUBCODE THEREBETWEEN

[75] Inventors: Hajime Watanabe, Tokyo; Yuji Ito; Hiroshi Yamazaki, both of Kanagawa; Hirotsugu Ohkubo, Tokyo; Sakae Okazaki, Tokyo; Naoki Nagano, Tokyo, all of Japan

[73] Assignee: Sony Corporation, Tokyo, Japan

[21] Appl. No.: 832,302

[22] Filed: Feb. 7, 1992

[30] Foreign Application Priority Data

Feb. 15, 1991 [JP] Japan ............................... 3-043037

[51] Int. Cl.6 .......................... G11B 5/02; G11B 5/09
[52] U.S. Cl. .................................. 360/19.1; 360/48; 360/72.2
[58] Field of Search ................ 360/13, 18, 19.1, 14.2, 360/14.1, 64, 72.2, 48

[56] References Cited

U.S. PATENT DOCUMENTS

| | | | |
|---|---|---|---|
| 4,641,208 | 2/1987 | Inazawa et al. | 360/72.2 |
| 4,688,116 | 8/1987 | Takahashi et al. | 360/72.2 |
| 4,799,111 | 1/1989 | Ito | 360/14.3 |
| 4,805,042 | 2/1989 | Nishikata | 360/14.3 |

FOREIGN PATENT DOCUMENTS

| | | |
|---|---|---|
| 0266174 | 5/1988 | European Pat. Off. . |
| 0391728 | 10/1990 | European Pat. Off. . |
| 61-236073 | 10/1986 | Japan . |
| 63-276761 | 11/1988 | Japan . |
| 2191885 | 12/1987 | United Kingdom . |

OTHER PUBLICATIONS

Patent Abstracts of Japan, vol. 13, No. 96 (P-839) 7 Mar. 1989.
Patent Abstracts of Japan, vol. 11, No. 79 (P-555) 11 Mar. 1987.

*Primary Examiner*—Andrew L. Sniezek
*Attorney, Agent, or Firm*—William S. Frommer; Alvin Sinderbrand

[57] ABSTRACT

In an apparatus which employs rotary heads for recording a video signal and a Pulse Code Modulated signal in first and second areas along successive slant tracks on a magnetic tape scanned by the heads and for recording a subcode signal in a third area in each slant track between the respective first and second areas; a pulse generator provides a pulse signal indicating a rotational position of each rotary head, the beginning of the subcode signal recorded in the third area of each track is dependent on the pulse signal, the end of the Pulse Code Modulated signal recorded in the respective first area is detected, and an erasing code signal is supplied to the rotary head scanning the tape for recording in an area of the respective slant track extending from the detected end of the Pulse Code Modulated signal in the first area to the position at which the recorded subcode signal begins in the third area.

11 Claims, 6 Drawing Sheets

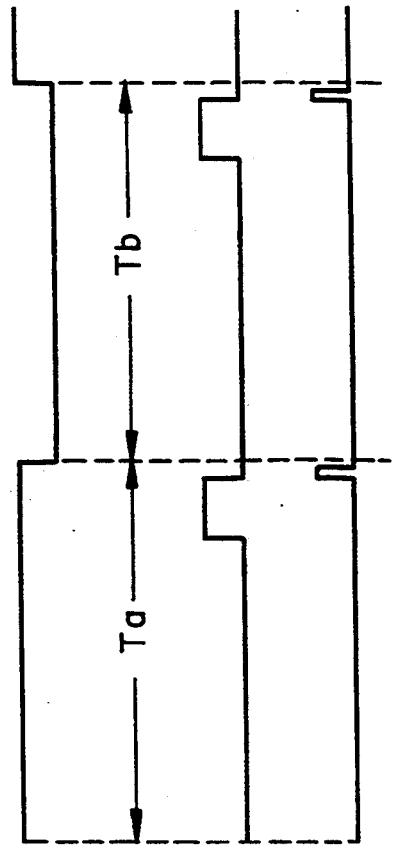
Fig. 2A Ps
Fig. 2B P1
Fig. 2C P2
(PRIOR ART)

Pb Pc Pd Pe Pf Pg

ROTARY HEAD VTR WHICH RECORDS VIDEO AND PCM SIGNALS IN RESPECTIVE AREAS OF A SLANT TRACK AND A SUBCODE THEREBETWEEN

BACKGROUND OF THE INVENTION

1. Field of the Invention

This invention relates generally to a video tape recorder (VTR) of the rotary head type and, more particularly is directed to a rotary head VTR in which a pulse code modulated (PCM) signal and a video signal are recorded in first and second areas, respectively, of an oblique or slant track on a magnetic tape and a subcode signal is recorded in an area of the track between the first and second areas.

2. Description of the Prior Art

Referring initially to FIG. 1A, it will be seen that a small rotary head VTR, for example, an 8 mm VTR, records signals on a magnetic tape 1 in successive slant tracks extending obliquely across the tape, and one of which is indicated at 31. In the track format used in the 8 mm VTR, each of the slant tracks 31 has a length corresponding to the rotational movement of a respective one of two diametrically opposed rotary heads 2a and 2b (FIG. 4) through a rotational angle of 221°. A track portion 31S corresponding to rotation of one of the rotary heads 2a and 2b through a rotational angle of 36° from the starting end of the track 31, that is, the end at which the rotary head enters into contact with the tape 1, is used for the recording of an audio signal. A track portion 31V corresponding to rotation of the head 2a or 2b through the remaining angle of 185° is used for the recording of the video signal.

As shown particularly on FIG. 1B, the track portion 31S is divided into successive areas 41-45 having respective lengths a-e. More specifically, the area 41 is a scan start area at which the rotary head 2a or 2b enters into contact with the tape 1, and which, for example, has a length corresponding to rotation of the respective head through an angle of 2.04°. The next area 42 is a preamble area having a length b which, for example, is equivalent to the rotation of the head 2a or 2b through an angle of 2.06°. The following area 43 is a PCM area having a length c which, for example, is equivalent to the rotation of the head 2a or 2b through an angle of 26.32°, and such area 43 is adapted for the recording therein, and reproducing therefrom of a PCM audio signal. The PCM area 43 is followed by a postamble area 44 which provides a back margin during after-recording, and which has a length d equivalent to a head rotation angle of, for example, 2.06°. The area 45 is a guard area interposed between the track portion 31S and the track portion 31V, and has a length e which, for example, is equivalent to a head rotation angle of 2.62°.

The PCM audio data recorded in the area 43 of each track represent stereophonic audio signals for one field period which have been time base compressed and pulse code modulated, and which include an error correction code, an ID code and the like. The signals to be recorded in the areas 42, 43 and 44 are converted into bi-phase mark signals which have a frequency of 2.9 MHz to represent the value "0" and the frequency 5.8 MHz to represent the value "1".

The track portion 31V is shown to be divided into a major area 46 having a length equivalent to the rotation of the head 2a or 2b through an angle of 180°, and which extends from the guard area 45 to a scan end area 47 having a length equivalent to a head rotation angle of 5°, and at which the head moves out of contact with the tape 1. The area 46 has recorded therein one field of a frequency multiplexed video signal conventionally comprised of an FM signal which has been modulated by a luminance signal, a carrier chrominance signal which has been low band converted, an FM signal which has been modulated by a monaural audio signal, and a pilot signal used for tracking and which is provided with four different frequencies.

Since the ID code is recorded in the area 43 together with the PCM audio signal, such ID code may represent various kinds of information or data, such as, the month, day and year of recording, a program number or the absolute position of the respective track along the tape. The ID code is convenient for use in editing, or conducting a search when reproducing the recorded information.

Conventionally, the ID code is distributed and recorded together with the PCM data in the area 43 by an interleaving operation. Therefore, in order to correctly reproduce the ID code, it is necessary for the rotary head 2a or 2b to accurately scan the area 43 along a substantial portion of its length c. However, in the search mode, since the tape 1 runs at a speed which is, for example, 30 times the tape speed used in the normal recording mode, the rotary head 2a or 2b scans obliquely across the PCM area 43. Consequently, in the search mode, the ID code cannot be correctly reproduced in a reliable manner. In order to overcome the foregoing problem, consideration has been given to the recording, in the postamble area 44 of the track portion 31S, of an ID code in the form of sub-digital data, frequently called an index or subcode signal.

In the case where an NTSC video signal is being recorded, one field of such video signal recorded in the area 46 has a duration of 262.5 H (in which H is a horizontal period). Thus, the head 2a or 2b moves through the rotational angle of 180° in the period 262.5 H, and the time for movement of the head through the postamble area 44 having a length d equivalent to a rotational angle of 2.06° is 262.5 H×2.06/180, or approximately 3.0 H. Postamble signals consisting of all "1"s for the PCM audio data in the area 43 are recorded in the initial half of the area 44 which is scanned in the period 1.5 H, and the sub-digital data or subcode signal is recorded in the latter half of the area 44 which is also scanned in the period 1.5 H.

The subcode signal recorded in the latter half of the area 44 has a predetermined format and is provided with a code which is the same as, or similar to the ID code recorded with the audio signal in the PCM area 43. The subcode signal may include information, such as, the absolute position of the respective track on the magnetic tape 1, the cut number of the respective recorded contents, the month, day and year and the hour, minute and second when the recorded performance occurred. In the event that the subcode signal is to be erased or is unnecessary, an erasing code is recorded in the latter half of the area 44 and has a predetermined bit pattern, such as, alternately arranged "0"s and "1"s. In a manner similar to the signal recorded in the PCM area 43 of the track portion 31S, the subcode signal is recorded in the latter half of the area 44 after having been converted into a bi-phase mark signal having the frequencies 2.9 MHz and 5.8 MHz for representing the values "0" and "1", respectively.

When the subcode signal is recorded in the latter half of the postamble area 44 as described above, the subcode signal can be reliably reproduced even in a variable speed reproducing mode, such as, a search mode in which the tape is advanced at 30 times its normal speed. Further, after the audio and video signals have been recorded, the subcode signal alone can be independently recorded. Thus, for example, after completion of the editing of the tape, a subcode signal can be recorded for identifying the chapter number or the like. Similarly, after completion of the editing, if the subcode signal is no longer necessary, it can be erased by an erasing code.

When the subcode signal is being recorded, a switching pulse Ps (FIG. 2A) which is suitably synchronized with the rotational phase of the rotary head 2a or 2b then scanning the tape 1 is used as a reference. More specifically, a pulse signal $P_1$ (FIG. 2B) which identifies the PCM area 43 and a pulse signal $P_2$ (FIG. 2C) which identifies the postamble area 44 are suitably generated in predetermined timed relationships to the edge or switching position of the switching pulse Ps which is at a high level for one field period Ta and is inverted to a low level for the next field period Tb.

In the case where the area for the recording of the subcode signal is determined on the basis of the conventional switching pulse Ps as a reference, the recording position of the subcode signal will fluctuate in accordance with corresponding allowable fluctuations in the phase of the switching pulse Ps. Such fluctuations in the phase of the switching pulse Ps are practically unavoidable due to a jitter component in the drum servo, acceptable adjustment errors, temperature fluctuations, less than precise compatibility, that is, variations between mass produced VTRs and the like. In the event of repeated after-recording of subcode signals, fluctuations between the positions where the subcode signals are recorded may cause a previously recorded subcode signal and a newly recorded subcode signal to exist simultaneously on the magnetic tape 1.

For example, if an area 48a where a subcode signal is recorded is assumed to be shown in a reference position on FIG. 3A, it will be apparent that, when recording is effected in a VTR in which the switching pulse Ps deviates in one direction and thereby advances the position at which the recording of the subcode signal is initiated, the subcode signal is then recorded in an area 48b positioned as shown on FIG. 3B. On the other hand, if recording is effected in a VTR in which the switching position of the pulse Ps is deviated in the other direction, the area 48c in which the subcode signal is recorded may be positioned as shown on FIG. 3C. Therefore, if the magnetic tape has initially had the subcode signal recorded thereon in the area 48b shown on FIG. 3B, and then after-recording of the subcode signal is effected in a different VTR having characteristics represented by FIG. 3C, the subcode signal previously recorded in the area 48b and the subcode signal after recorded in the area 48c may simultaneously exist in the same track, as shown in FIG. 3D. In such case, erroneous operation may result from the fetching of the subcode signal recorded in the area 48b rather than the subcode signal after-recorded in the area 48c.

Heretofore, it has been proposed to precede the after-recording of the subcode signal by an erasing operation in which an erasing code is recorded over an erasing area that is substantially wider than the area in which the subcode signal is recorded so as to avoid the simultaneous presence on the tape of previously and after-recorded subcode signals, as shown in FIG. 3D. However, if the erasing area is made sufficiently wide to ensure that a previously recorded subcode signal will be entirely deleted, there is the danger that the PCM signal in the area 43 or the video signal in the area 46 will be damaged by the erasing code recorded in the relatively wide erasing area. In order to avoid such possibility of damage to the PCM signal or the video signal, it would be necessary to relatively severely limit the possible fluctuation of the switching pulse Ps to, for example, about 0.5 H. However, according to the existing standards for the 8 mm VTR, the allowable fluctuation of the switching position is ±1.5 H for the NTSC system.

OBJECTS AND SUMMARY OF THE INVENTION

Accordingly, it is an object of this invention to provide a rotary head VTR which records a subcode signal between video and PCM signals recorded in respective areas of a slant track without encountering the above described problems associated with the prior art.

More specifically, it is an object of this invention to provide a rotary head VTR which records a subcode signal between video and PCM signals recorded in respective areas of a slant track, as aforesaid, and in which the subcode signal can be after-recorded while ensuring that a previously recorded subcode signal is entirely deleted without the possibility of obliterating or damaging any of the PCM or video signals recorded in the respective slant track.

In accordance with an aspect of this invention, apparatus for recording PCM, video and subcode signals on a magnetic tape comprises rotary recording head means scanning a slant track on the magnetic tape; pulse generator means for generating a pulse signal which indicates a rotational position of the rotary head means; means for supplying a PCM signal to the rotary head means for recording by the latter in a first area of the slant track being scanned; means for supplying a video signal to the rotary head means for recording by the latter in a second area of the slant track being scanned; means for supplying a subcode signal to the rotary head means for recording by the latter in a third area of the slant track situated between the first and second areas and which starts at a position dependent upon the occurrence of the pulse signal; means for detecting an end of the PCM signal recorded in the first area; and means for supplying an erasing code signal to the rotary head means for recording by the latter in an area of the slant track extending from the end of the PCM signal recorded in the first area to the position at which the recorded subcode signal starts in the third area.

Since the erasing code signal is recorded in the scanned slant track from the detected end of the area in which the PCM signal is recorded to the position at which recording of the subcode signal is initiated, and which is specified by the switching pulse, it is possible to after-record the subcode signal without the possibility that any of the previously recorded subcode signal will remain in the slant track, thereby ensuring that the after-recorded subcode signal will be correctly read.

The above, and other objects, features and advantages of the present invention, will become readily apparent from the following detailed description of a preferred embodiment when read in connection with the accompanying drawings in which corresponding parts are identified by the same reference numerals in the several views.

BRIEF DESCRIPTION OF THE DRAWINGS

FIGS. 2A-2C are timing charts to which reference is made in explaining how the recording of various signals in accordance with the recording pattern of FIGS. 1A and 1B is conventionally timed;

DETAILED DESCRIPTION OF A PREFERRED EMBODIMENT

Figure 1A:
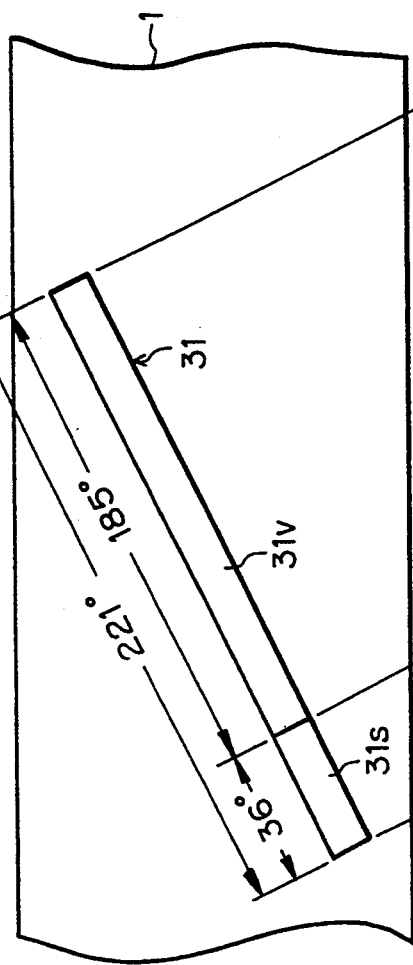
FIGS. 1A and 1B are schematic diagrams showing a recording pattern used in a VTR of a type to which the invention can be readily applied.
Figure 1B:
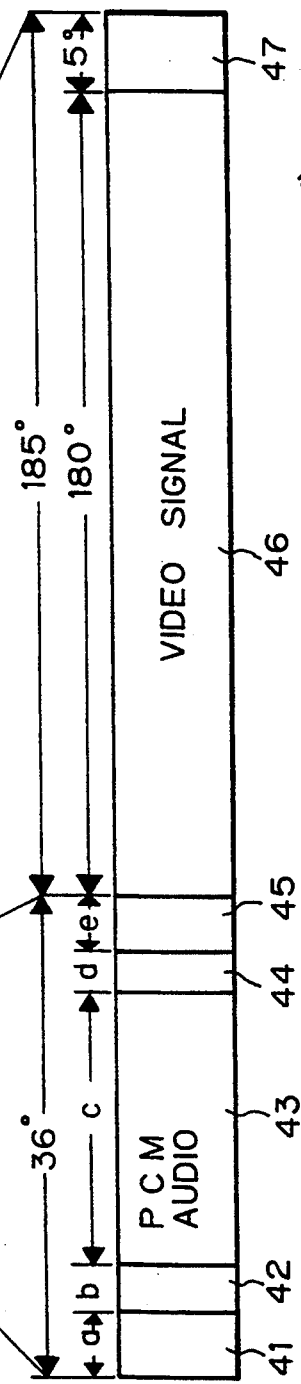
Figure 4:
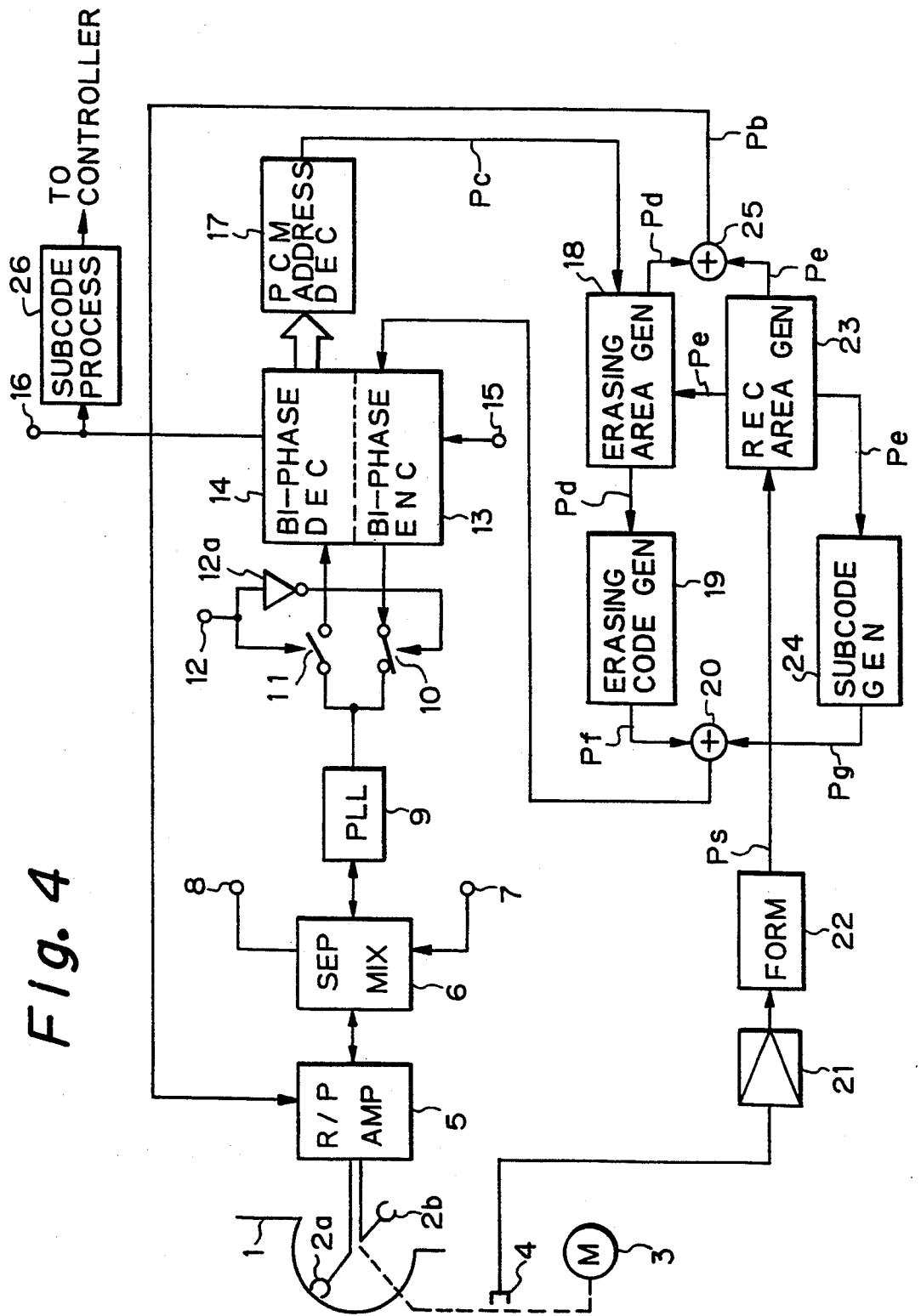
FIG. 4 is a block diagram of a recording and reproducing circuit included in a VTR in accordance with an embodiment of the present invention.

Referring to FIG. 4 in detail, it will be seen that rotary heads 2a and 2b mounted on a rotary drum (not shown) at diametrically opposed locations are adapted to scan oblique or slant tracks on the magnetic tape 1 which is wound around the peripheral surface of the rotary drum with a wrap angle of 221°. The magnetic tape is conventionally fed at a constant velocity during recording, while the rotary heads 2a and 2b are rotated by a drum motor 3 so as to effect a single complete revolution during each frame period of the video signal to be recorded. Rotational phases or positions of the rotary heads 2a and 2b are detected by a conventional rotational position detector 4 which, for example, provides a pulse as each of the heads 2a and 2b is positioned at the start of the track portion 31v (FIG. 1A) in which a field of a video signal is to be recorded. The VTR having the recording and reproducing circuit shown on FIG. 4, employs the same recording format as has been previously described with reference to FIGS. 1A and 1B for recording a PCM audio signal and a video signal in respective areas of each slant track, and for recording a subcode signal between the recorded PCM and video signals.

As shown in FIG. 4, an amplifier 5 is connected to the rotary heads 2a and 2b and is operative, in a recording mode, to amplify the signals to be recorded by such heads in slant tracks on the tape 1, whereas, the amplifier 5 is operative to amplify the signals reproduced by the heads 2a and 2b from the slant tracks respectively scanned thereby in a reproducing or playback mode. In the recording mode, a video signal to be recorded, and which comprises a frequency modulated luminance signal, a low band converted chrominance signal, a frequency modulated audio signal and a tracking pilot signal having one of four different frequencies which are repeated cyclically, is supplied to a mixing/separating circuit 6 from an input terminal 7.

In the recording mode, the circuit 6 operates to mix, for example, by time-division multiplexing, the video signal to be recorded, which is applied to the input terminal 7, with other signals to be recorded, such as, a PCM audio signal, a subcode signal and an erasing code signal produced as hereinafter described in detail. The resulting mixed or multiplexed signals are supplied from circuit 6 through amplifier 5 to the rotary heads 2a and 2b for recording in the slant tracks being respectively scanned thereby. In the reproducing or playback mode, the circuit 6 receives the amplified reproduced signals from the amplifier 5 and separates therefrom the reproduced video signal which is supplied to an output terminal 8, and which again comprises a frequency modulated luminance signal, a low band converted chrominance signal, a frequency modulated audio signal and a tracking pilot signal. Further, in the reproducing mode, a phase locked loop (PLL) circuit 9 connected with the mixing/separating circuit 6 is operative to provide a clock signal from the reproduced PCM signal.

A pair of switches 10 and 11 are connected in parallel through the PLL circuit 9 to the mixing/separating circuit 6 and are controlled by a switch control signal supplied from an input terminal 12 directly to the switch 11 and through an inverter 12a to the switch 10 so that the switches 10 and 11 are alternatively opened and closed. The switch 10 is connected with the output of a bi-phase mark modulation encoder 13, and the switch 11 is connected with the input of a bi-phase mark modulation decoder 14. In the recording mode, switch 10 is closed and switch 11 is open, and signals to be recorded in the track portion 31S are supplied from the bi-phase mark modulation encoder 13 through the closed switch 10 and include a PCM audio signal applied to the encoder 13 from an input terminal 15.

In the reproducing or playback mode, the switch 11 is closed and the switch 10 is open so that signals reproduced from the track portion 31S are supplied to the bi-phase mark modulation decoder 14 through the switch 11. A PCM audio signal reproduced from each track portion 31S on the magnetic tape 1 by the rotary head 2a or 2b is converted into NRZ by the decoder 14 and is supplied to an output terminal 16. Examples of non-return-to-zero (NRZ) codes are provided in *Introduction to the 4:2:2 Digital Video Tape Recorder*, Gregory, Pentech Press, London, 1988 at page 73. A PCM decoder 17 is connected with the bi-phase mark modulation decoder 14, and is operative to decode, from the reproduced PCM audio signal, an address signal inserted therein.

Figures 5A, 5B, 5C, 5D, 5E, 5F, 5G:
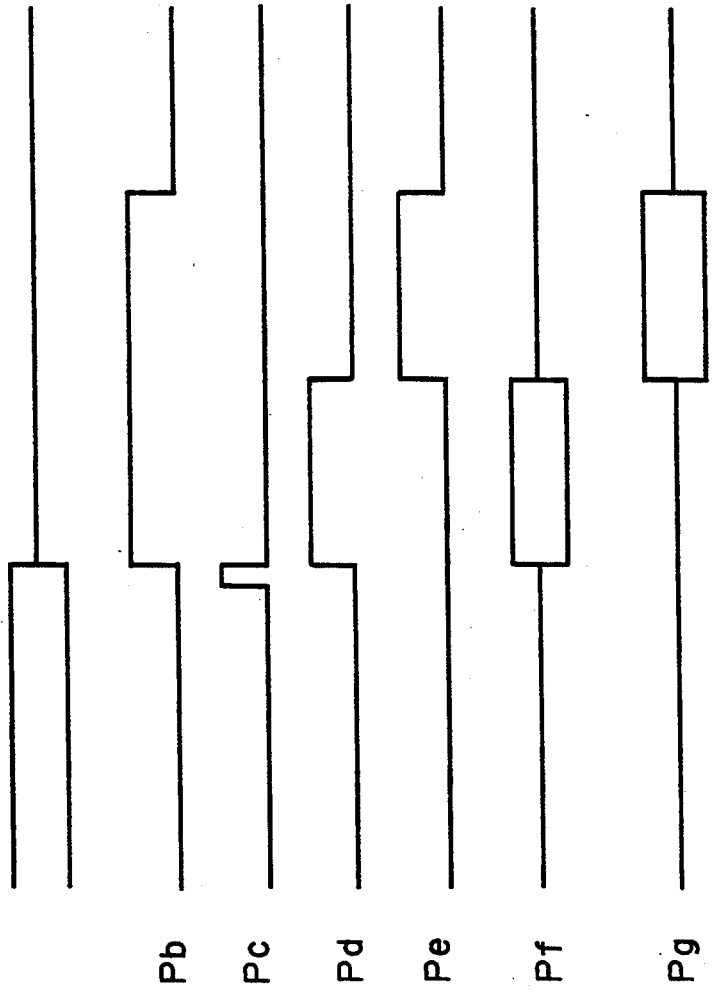
FIGS. 5A-5G are timing charts to which reference will be made in explaining the operation of the VTR embodying this invention.

When the rotary heads 2a and 2b scan the magnetic tape 1 in the reproducing mode, each of the heads 2a and 2b reliably scans the track portion 31S at the beginning or starting end portion of the respective track, so that a reproduced PCM signal is obtained, as shown in FIG. 5A. The clock produced by the PLL circuit 9 in synchronism with the reproduced PCM signal is employed by the bi-phase mark modulation decoder 14 for converting the reproduced PCM signal and reproduced subcode signal into NRZ waveforms, and the presence or absence of errors is also checked by a CRC code. An example of a cyclic redundancy check code or CRC code is provided in *The D-2 Digital Video Recorder*, Watkinson, Focal Press, London, 1990 at page 124. When the address decoder 17 decodes the end address of the PCM signal, an end pulse Pc (FIG. 5C) is generated to indicate the respective position. Such end pulse Pc is supplied to an erasing area generating circuit 18 which, in response thereto, initiates the generation of an erasing area signal Pd (FIG. 5D).

The head position detection pulse from detector 4 is supplied through an amplifier 21 to a pulse forming circuit 22 for generating the switching pulse Ps (FIG. 2A) which is inverted at every field of the video signal. The switching pulse Ps is supplied to a recording area generating circuit 23 having a counter (not shown) which starts a counting operation from the edge of the switching pulse Ps and, when the count attains a predetermined value, initiates the generation of a subcode recording area signal Pe (FIG. 5E) of a predetermined duration which specifies a recording area for a subcode.

As shown on FIG. 4, the subcode recording area signal Pe is supplied to the erasing area generating circuit 18 and, when the signal Pe rises at the initiation of the subcode recording area signal (FIG. 5E), the erasing area signal Pd (FIG. 5D) is terminated.

The erasing area signal Pd is shown to be supplied to an erasing code generating circuit 19 which generates an erasing code signal Pf (FIG. 5F) for the duration of the erasing area signal Pd. For example, the erasing code signal Pf may be comprised of alternating "0"s and "1"s which are repeated for so long as the erasing area signal Pd is at a high level. The erasing code signal Pf is supplied to one input of an adding circuit 20 which, at its other input, receives a subcode signal Pg (FIG. 5G) from a subcode generating circuit 24 for the duration of the subcode recording area signal Pe (FIG. 5E) received by the subcode generating circuit 24 from the recording area generating circuit 23. The subcode generating circuit 24 may be constituted by a suitable controller or microprocessor to form the desired subcode signal, or by a memory or the like. The output of the adding circuit 20, that is, the erasing code signal Pf followed immediately by the subcode signal Pg, is supplied to the bi-phase mark modulation encoder 13 so as to be also encoded by the latter.

The erasing area signal Pd and the subcode recording area signal Pe (FIGS. 5D and 5E) are shown on FIG. 4 to be supplied to respective inputs of an adding circuit 25. The resulting output or recording area signal Pb (FIG. 5B) obtained from the adding circuit 25 is supplied to the recording/reproducing amplifier 5. When effecting after-recording of a subcode signal, the recording amplifier 5 is made active or operative only for a period of time during which the signal Pb is at a high level. Therefore, in the after-recording mode, the erasing code signal is bi-phase mark modulated by the encoder 13 from the time when the address decoder 17 decodes the end address of the PCM signal, and is recorded on the magnetic tape in a slant track from the end of the area 43 in which the PCM signal is recorded up to the start of the area in which the subcode signal Pg is recorded.

The recording and reproducing circuit of FIG. 4 is shown to be completed by a subcode processing circuit 26 which is connected to the output terminal 16 so that, in the reproducing mode of the apparatus, that is, when the switch 11 is closed, the reproduced PCM signal and reproduced subcode signal converted into NRZ waveforms by the bi-phase mark modulation decoder 14 are also received by the subcode processing circuit 26 which is operative to separate the effective subcode data. In other words, as is usually the case, if two or more subcodes are recorded in the track portion 31s of a track having a field recorded in its portion 31v, the processing circuit 26 fetches the subcode which has been first reproduced as the effective subcode which is supplied to a suitable controller.

Figure 3A:
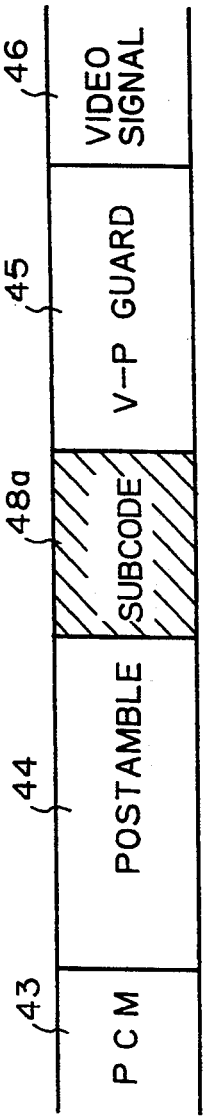
FIGS. 3A-3D are schematic diagrams illustrating recording patterns that may be attained when the timing of the recording of various signals is conventionally controlled, as described with reference to FIGS. 2A-2C.
Figure 3B:
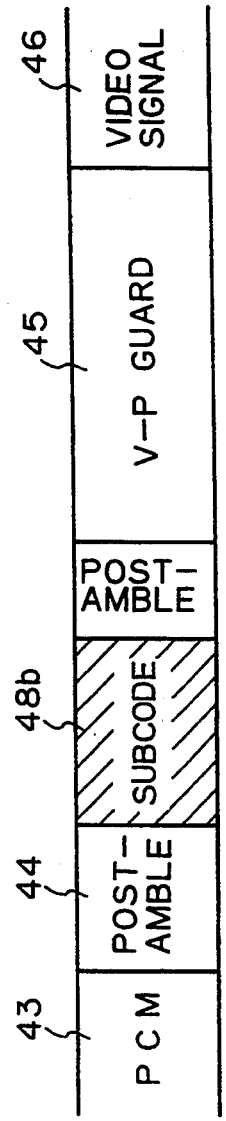
Figure 3C:
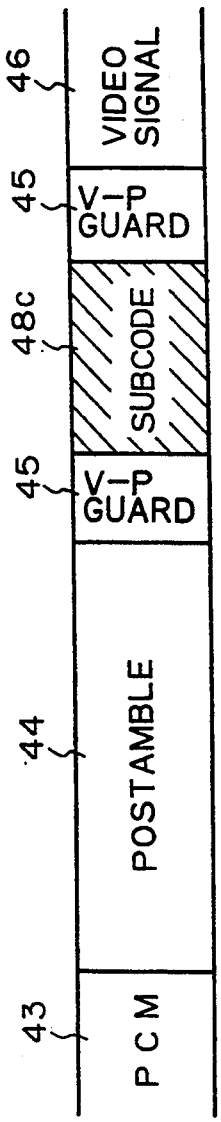
Figure 3D:
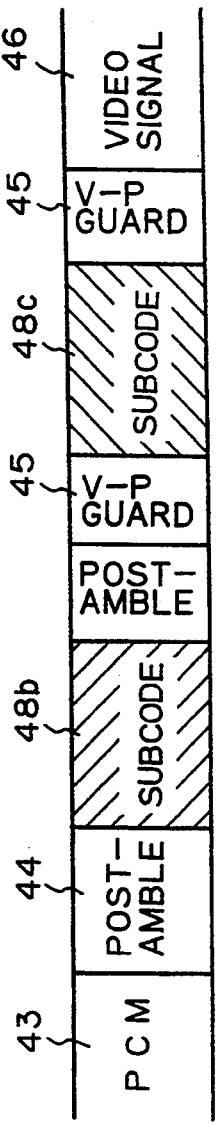
Figure 6A:
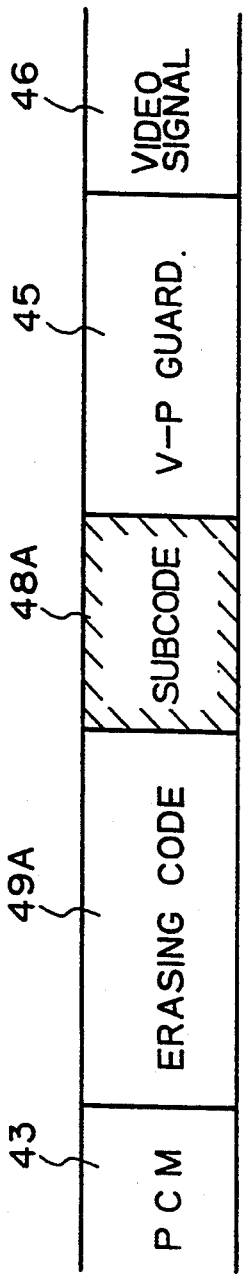
FIGS. 6A-6C are schematic diagrams showing recording patterns achieved with the VTR embodying this invention, and to which reference will be made in explaining how such recording patterns avoid the problems associated with the prior art.
Figure 6B:
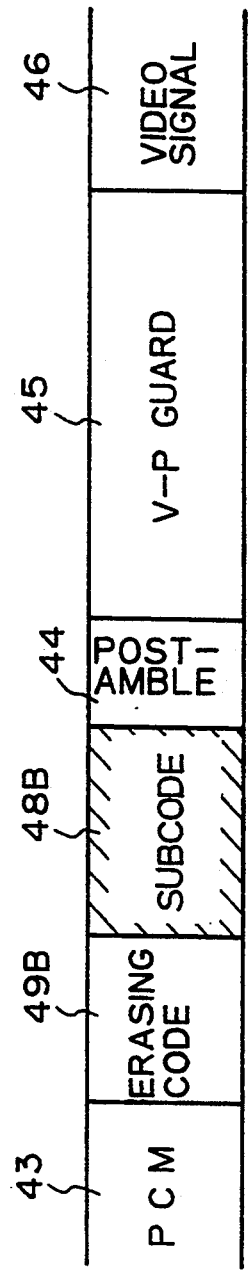
Figure 6C:
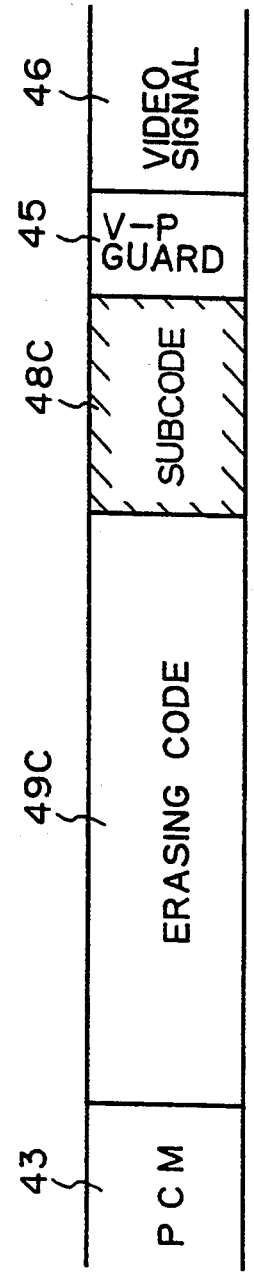

Referring now to FIGS. 6A, 6B and 6C, it will be seen that such views are generally similar to FIGS. 3A, 3B and 3C, respectively, but illustrate recording patterns produced under various conditions by a VTR embodying the present invention. More specifically, FIG. 6A again illustrates the situation in which an area 48A in which the subcode signal is recorded is assumed to be a reference position, with the erasing code signal being recorded in the area 49A extending from the end of the area 43 containing the PCM audio signal to the start of the area 48A in which the subcode signal is recorded. If the switching position of the pulse signal Ps, which determines the start of the area for the recording of the subcode signal, deviates in one direction, for example, as shown on FIG. 6B, the area 49B in which the erasing code signal is recorded still extends from the end of the recording area 43 for the PCM signal to the beginning of the recording area 48B for the subcode signal. If the switching position of the pulse signal Ps deviates in the opposite direction, for example, so as to move the area 48C in which the subcode signal is recorded to the position shown on FIG. 6C, the area 49C in which the erasing code signal is recorded is suitably extended so as to still extend from the end of the area 43 in which the PCM signal is recorded to the start of the area 48C in which the subcode signal is recorded. In other words, the length of the recording area 49A, 49B or 49C for the erasing code signal changes in correspondence to any deviation of the switching position of the pulse signal Ps.

It will be appreciated from the above that, if the magnetic tape initially has a subcode signal recorded thereon by a VTR having a characteristic represented by FIG. 6B, the after-recording of a subcode signal on such magnetic tape in a VTR having the characteristic illustrated by FIG. 6C will result in the subcode signal initially recorded in the area 48B being deleted by the erasing code signal recorded in the area 49C, with the result that only the subcode signal after-recorded in the area 48C will remain.

On the other hand, if the subcode signal is initially recorded on the magnetic tape in a VTR having the characteristic shown on FIG. 6C and then after-recording of the subcode signal is effected in a VTR having the characteristic illustrated in FIG. 6B, both the new subcode signal or data in the area 48B and the old or original subcode signal or data recorded in the area 48C will remain on the tape. However, since the position of the new or after-recorded subcode signal in the area 48B precedes the position, in the direction of scanning along the track, of the old subcode signal recorded in the area 48C, the subcode processing circuit 26, in selecting the first reproduced subcode data as the effective data in accordance with the general rule, will select the after-recorded or new subcode signal for use as the effective subcode signal. Therefore, the previously described problem encountered in the prior art, that is, confusion as to the effective subcode signal or data when two or more subcode signals are recorded in the same track, cannot occur.

Thus, in accordance with this invention, subcode data can be conveniently after-recorded with the same format as earlier recorded subcode data between the postamble area 44 and the guard area 45 (FIG. 1B) without the possibility that any of the previously recorded subcode data remaining subsequent to the after-recording will interfere with the reliable fetching or reading of the newly recorded subcode data.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for recording PCM, video and subcode signals on a magnetic tape, said apparatus comprising:
    rotary recording head means for scanning a slant track on said magnetic tape;
    pulse generator means for generating a pulse signal which indicates a rotational position of said rotary head means;
    means for supplying a PCM signal to said rotary head means for recording by the latter in a first area of said slant track;
    means for supplying a video signal to said rotary head means for recording by the latter in a second area of said slant track;
    means for supplying a subcode signal to said rotary head means for recording by the latter in a third area of said slant track situated between said first and second areas and which starts at a position dependent upon said pulse signal;
    means for detecting an end of said PCM signal recorded in said first area; and
    means for supplying an erasing code signal to said rotary head means for recording by the latter in an area of said slant track extending from said end of the PCM signal recorded in said first area to said position at which the recording of the subcode signal starts in said third area.

2. Apparatus according to claim 1; in which said PCM signal contains a coded address signal indicating said end of the PCM signal recorded in said first area; and said means for detecting includes means for decoding said coded address signal and providing therefrom a start signal to said means for supplying said erasing code signal.

3. Apparatus according to claim 2; in which said PCM signal is an audio signal.

4. Apparatus according to claim 2; in which said means for supplying said subcode signal includes means responsive to said pulse signal for initiating a subcode recording area signal of predetermined duration, and means for generating said subcode signal for said duration of said subcode recording area signal.

5. Apparatus according to claim 4; in which said means for supplying said erasing code signal includes means responsive to said start signal for initiating an erasing area signal and being responsive to the initiation of said subcode recording area signal for terminating said erasing area signal, and means for generating said erasing code signal during the existence of said erasing area signal.

6. Apparatus according to claim 1; in which said rotary head means are additionally operative in a reproducing mode to reproduce signals recorded in said slant track; and further comprising subcode processing means receiving an output of said rotary head means in said reproducing mode of the latter and separating from said output, as an effective subcode signal, the subcode signal which is first reproduced from said slant track between said first and second areas.

7. Apparatus according to claim 1; further comprising bi-phase mark modulation encoding means through which said PCM signal, said subcode signal and said erasing code signal are supplied to said rotary recording head means for recording on said track.

8. Apparatus according to claim 1, further comprising means for producing a start signal based on the detected end of said PCM signal, and wherein said means for supplying said erasing code signal is operative to supply said erasing code signal in response to said start signal.

9. Apparatus for recording PCM, video and subcode signals on a magnetic tape, said apparatus comprising:
    rotary recording head means for scanning a slant track on said magnetic tape;
    pulse generator means for generating a pulse signal which indicates a rotational position of said rotary head means;
    means for supplying a PCM signal to said rotary head means for recording by the latter in a first area of said slant track and including bi-phase mark modulation encoding means through which said PCM signal is supplied to the rotary head means;
    means for supplying a video signal to said rotary head means for recording by the latter in a second area of said slant track and;
    means for supplying a subcode signal to said rotary head means for recording by the latter in a third area of said slant track situated between said first and second areas and which starts at a position dependent upon said pulse signal, the means for supplying the subcode signal including bi-phase mark modulation encoding means through which the subcode signal is supplied to the rotary head means;
    means for detecting an end of said PCM signal recorded in said first area; and
    means for supplying an erasing code signal to said rotary head means for recording by the latter in an area of said slant track extending from said end of the PCM signal recorded in said first area to said position at which the recording of the subcode signal starts in said third area, the means for supplying the subcode signal including bi-phase mark modulation encoding means through which the erasing code signal is supplied to the rotary head means;
    said rotary head means being additionally operative in a reproducing mode to reproduce signals recorded in said slant track;
    said apparatus further comprising means for generating a clock signal synchronized with a PCM signal included in said signals reproduced by said rotary head means in said reproducing mode, and bi-phase mark modulation decoding means employing said clock signal for converting the PCM signal and subcode signal included in the reproduced signals into corresponding non-return-to-zero waveforms.

10. Apparatus according to claim 9; further comprising subcode processing means for receiving said non-return-to-zero waveforms from said decoding means and fetching therefrom, as an effective subcode, the subcode which has been first reproduced from said slant track between said first and second areas.

11. Apparatus for recording PCM, video and subcode signals on a magnetic tape, said apparatus comprising:

rotary recording head means for scanning a slant track on said magnetic tape;

recording amplifier means actuable for causing recording operation of said head means;

pulse generator means for generating a pulse signal which indicates a rotational position of said rotary head means;

means for supplying a PCM signal to said recording amplifier means for recording by the rotary head means in a first area of said slant track, said PCM signal including a coded address signal indicating said end of the PCM signal recorded in said first area;

means for supplying a video signal to said recording amplifier means for recording by the rotary head means in a second area of said slant track;

means responsive to said pulse signal for initiating a subcode recording area signal of predetermined duration;

means for generating a subcode signal for said duration of said subcode recording area signal for recording by said rotary head means in a third area of said slant track situated between said first and second areas and which starts at a position dependent upon said pulse signal;

means for decoding said coded address signal to detect the end of said PCM signal recorded in said first area and providing therefrom a start signal;

means responsive to said start signal for initiating an erasing area signal and being responsive to the initiation of said subcode recording area signal for terminating said erasing area signal;

means for generating said erasing code signal during the existence of said erasing area signal for recording of the erasing code signal by the rotary head means in an area of said slant track extending from said end of the PCM signal recorded in said first area to said position at which the recorded subcode signal starts in said third area; and means for combining said erasing area signal and said subcode recording area signal to actuate said recording amplifier means for recording by said head means of said erasing code signal and said subcode signal in sequence.

* * * * *